United States Patent [19]

Prange et al.

[11] Patent Number: 4,725,946
[45] Date of Patent: Feb. 16, 1988

[54] P AND V INSTRUCTIONS FOR SEMAPHORE ARCHITECTURE IN A MULTIPROGRAMMING/MULTIPROCESSING ENVIRONMENT

[75] Inventors: Patrick E. Prange, Brookline; James B. Geyer, Natick; Victor M. Morganti, Lincoln, all of Mass.

[73] Assignee: Honeywell Information Systems Inc., Waltham, Mass.

[21] Appl. No.: 749,244

[22] Filed: Jun. 27, 1985

[51] Int. Cl.[4] ............................................. G06F 9/46
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 4,080,650 | 3/1978 | Beckett | 364/200 |
| 4,084,228 | 4/1978 | Dufond et al. | 364/200 |
| 4,229,790 | 10/1980 | Gilliland et al. | 364/200 |
| 4,374,409 | 2/1983 | Bienvenu et al. | 364/200 |
| 4,382,279 | 5/1983 | Ugon | 364/200 |
| 4,385,350 | 5/1983 | Hansen et al. | 364/200 |
| 4,412,285 | 10/1983 | Neches et al. | 364/200 |
| 4,545,015 | 10/1985 | Baunach et al. | 364/200 |
| 4,621,319 | 11/1986 | Braum et al. | 364/200 |

OTHER PUBLICATIONS

Hwang et al., *Computer Architecture and Parallel Processing*, pp. 558–565.

Primary Examiner—Archie E. Williams, Jr.
Assistant Examiner—Michael J. Ure
Attorney, Agent, or Firm—Nicholas Prasinos; John S. Solakian

[57] ABSTRACT

In a computer system having a plurality of processors and processes, a semaphore architecture for communication with and between the processes in order to effects coordination and cooperation between processes. The invention is implemented in firmware and software, and divides the work of an entire semaphore operation such that the simple part of the P and V operations (which deliver and pick-up signals to and from the processes, respectively) is done by the firmware; whereas the difficult work of the P or V operation is done by software. Thus the improved architecture increases the speed of the system by the use of firmware and increases the flexibility of the computer system by utilizing software to change functionality.

2 Claims, 9 Drawing Figures

P AND V INSTRUCTIONS FOR SEMAPHORE ARCHITECTURE IN A MULTIPROGRAMMING/MULTIPROCESSING ENVIRONMENT

RELATED APPLICATIONS AND PATENTS

The following U.S. patent applications and/or patents are related documents to the instant application:

Method of and System Using P and V Instructions on Semaphores for Transferring Data Among Processes in a Multiprocessing System, invented by Jacques Bienvenu et al, having U.S. Pat. No. 4,374,409, issued Feb. 15, 1983.

Apparatus and Method for Transferring Information Units Between Processes in a Multiprocessing System, invented by Jacques Bienvenu et al, issued July 19, 1983, having U.S. Pat. No. 4,394,725.

Protection of Data in an Information Multiprocessing System by Implementing a Concept of Rings to Represent the Different Levels of Privileges Among Processes, invented by Marc Appell et al, having U.S. Pat. No. 4,177,510, issued Dec. 4, 1979.

Ring Checking Hardware, invented by Parmar et al, having U.S. Pat. No. 3,916,385, issued Oct. 28, 1975.

Call Instruction for Ring Crossing Architecture, invented by Morganti et al, assigned to the same assignee named herein, having U.S. Ser. No. 749,245, filed 6/27/85, now U.S. Pat. No. 4,703,417.

BACKGROUND

1. Field of the Invention

This invention relates generally to computer systems, and more particularly to a semaphore architecture for communicating between computer processes in a multiprogramming/multiprocessing environment.

2. Description of the Prior Art

Processing in first generation hardware/software computer systems was relatively straight-forward where the job of programming was considered to be the basic processing unit. For each user initiated job or transaction a program generally ran with little or not interruption until the job or transaction was completed. Many straight-forward jobs, such as the compilation and execution of a high level language program, such as Fortran, could and did run as a single process. More difficult jobs, however, would require multitask operations; and they would create other processes as they ran. (Note that a process is a concept implying the carrying on of some activity and should not be confused with the concept of a program, which is an activity description; and can be used by one or more processes. We can speak either of a process or a processor executing a program.)

The concept of a process as being the basic processing unit developed to fill a need for the multiprogramming/multiprocessing environment of third generation computers. In such an environment where many users are demanding service simultaneously, it is natural to conceive of multiple processes competing for resources within the computer system. Each process consists of a program (i.e., an ordered collection of instructions and other data associated with the instructions) which is executed by the computer, and operates on data to perform a user's job, or some phase of that job. Where many such processes are demanding simultaneous attention from the system, the task of communicating with and between such processes and the task of controlling and allocating resources to such processes, particularly in view of the requirements of fourth generation systems becomes extremely complex.

In a multiprogramming/multiprocessing environment, it is essential that cooperation between two or more sequential processes be efficiently and expeditiously realized. While many solutions to this problem have been proposed in the past, the technique of process communication and control needed for the fourth generation computers germinated in the concepts developed by E. W. Dijkstra in a paper entitled "Cooperative Sequential Processes from Programming Languages", NATO Advanced Study Institute, edited by F. Jenuys of Paris, and published in Academic Press in 1968. In this paper Dijkstra postulates a basic concept of a semaphore for use in proces synchronization and P and V instructions operating upon the semaphore. Unfortunately, Dijkstra provides for process communication and process synchronization solely by software usage, thus not only slowing down the operating time of the system, but also decreasing the efficiency and overall overhead required for such a system. More importantly, Dijkstra does not provide the concepts required for any significant exploitation of a fourth generation computer since he formulates only a basic premise in process synchronization. Moreover the concepts of P and V instructions expounded by Dijkstra are presented only in generalized terms and do not provide the system configuration needed in the fourth generation computer. Moreover, Dijkstra merely provides a software basis for interpreting and using P and V instructions. Accordingly where a process was designed to perform one of these P or V operations, it would evoke an operating system routine to perform it. The operating system routine would frequently have to run with interrupts inhibited to prevent other processes from gaining control of the processor while it is manipulating the semaphore. The operating system subroutine then does the incrementing and decrementing of the semaphore, as the case may be, and if necessary manipulates the process queues. After it has completed all these operations, it once again enables interrupts and returns to the evoking process.

In later work the P and V operations were implemented in firmware. (See patents incorporated by reference herein.) The difficulty here is that the firmware is now made aware of the data structures used to implement the concept of a process and to manage process queues. This means that for practical purposes the software cannot change the topology of these structures once the firmware has been implemented and these structures designed into the system. This is a very rigid position for the software where it is preferable to be able to change these structures due to changing needs, such as use of alternate queueing for new algorithms.

What was needed, therefore, was a method and apparatus for coordinating and communicating with processes that has the advantages of the P and V operations implemented in software, as well as those implemented in firmware, without the attendant disadvantages of each.

OBJECTS OF THE INVENTION

It is a primary object of the invention to provide an improved system and method for process synchronization in the multiprogramming/multiprocessing environment.

It is another object of the invention to provide a system and method utilizing a semaphore and improved P and V instructions.

It is still a further object of the invention to provide a system and method for process synchronization via a semaphore structure utilizing P and V instructions implemented in firmware and software.

SUMMARY OF THE INVENTION

The foregoing objects are achieved according to one embodiment of the invention and according to one mode of operation thereof by providing in a data processing system a semaphore architecture having P and V instructions implemented in firmware and software.

A process that performs a P instruction requests data in order to continue operating. A process that performs a V instruction delivers data.

The invention divides the work of an entire semaphore operation such that the simple part of the P or V operation can be done by the firmware; whereas the difficult work of the P or V operation is done by software subroutines. For example, in a P operation with this instruction the decrementing of the resource count and testing it, is done by a semaphore instruction directly in firmware. If the resource is available and the process does not have to wait, the control flows to the next instruction without any special action taking place. However if the resource is not available and the process has to be placed in a wait-state, the firmware passes control to the software in order to perform this requirement in the form of a trap to a special routine that will cause an inward ring change to be made to gain the privilege necessary to manipulate the system data structures necessary to put the process in a wait-state. The ring crossing is affected in the same manner as if a call instruction had been executed instead of a semaphore instruction.

Accordingly there is a simple part to the P and V instructions that is done directly by firmware. If there is no requeusing of the process required, the entire operation is done by firmware. If on the other hand, there is more complex work and requeueing is necessary, the work is passed on to a privileged software subroutine that will be part of the operating system's code and not the application code. This means that the firmware can be simple and fast in most cases and not rely on the software, and accordingly it is not necessary to have knowledge of the topology of the data structures and the software used to support the process scheduling.

BRIEF DESCRIPTION OF THE DRAWINGS

The novel features which are characteristic of the invention are set forth with particularity in the appended claims. The invention itself, however, both as to organization and operation together with further objects and advantages thereof, may be understood by reference to the following description taken in conjunction with the drawing in which:

DESCRIPTION OF A PREFERRED EMBODIMENT

General Discussion

The invention operates typically in a computer system environment which is similar to that disclosed in U.S. Pat. No. 4,374,409, issued Feb. 15, 1983, and U.S. Pat. No. 4,394,725, issued July 19, 1983. It should be noted that FIG. 4 in the instant application is a diagrammatic representation of visible registers of a computer system having an environment in which the present invention operates. However, not all these registers are necessary for the operation of the invention. Accordingly only those registers which are necessary for the invention are shown and described in FIGS. 4–7.

In order to better understand the nature of semaphores and to gain some background with respect to P operations and V operations, the reader is referred to the above-referenced U.S. Pat. Nos. 4,394,725, 4,374,409 and 4,177,510, and particularly the section entitled "Semaphores Revisited" in U.S. Pat. No. 4,394,725.

Briefly a process can be in one of four possible states at any time: running, ready, waiting or suspended. The hardware recognizes these four possible process states and executes various firmware procedures to effect process dispatching, state changes and to maintain data structures based on the process' state. A process is in the running state when it has control of the CPU. This state involves supplying the CPU with the address space (segment tables) and a starting address. The CPU then executes instructions in the procedure segments of the process. The ready state is equivalent to a running state, except that the process does not have control of the CPU because it has not been recognized by the CPU. A process in the ready state is in contention for the CPU with other ready processes and the running process. A process is in the wait state when it cannot continue until a specific event occurs, such as a message via a semaphore. A waiting process is not in contention for the CPU, but it may be in contention with other waiting processes for the requried event. A suspended process is a process which has been stopped for a time by software and may be resumed later. The decision to stop and resume the process is external to the process. Thus, a suspended process is not active and therefore cannot receive notification of event occurrences and cannot utilize the CPU. Processes move from one state to another voluntarily by action of the process while running, or involuntarily by actions of other processes.

In a multiprocessing environment, process synchronization is required to coordinate the activities of two processes working on the same task. The synchronization is achieved using semaphores which are data structures residing in the address base of communicating processes. A semaphore is used to signal an event occurrence and to handle queues of messages. An event in this context is anything observed by a process which may be of interest to some other process. The event may be the completion of an asynchronous operation or the availability of a resource.

A process uses two semaphore operations to signal an event occurrence. One operation sends a signal to a semaphore; the other picks up a signal from the semaphore. (The sending operation is called a V operation; the receiving operation is called a P operation.) The sending operation allows the process to send a signal that data are ready. The semaphore stores the signal until another process is ready to pick it up. Thus the sending process is free to proceed, since it has sent the signal. The receiving operation examines a specified semaphore and picks up the signal. If a signal is present, the receiving process continues executing. However, if there is no signal at the semaphore, the receiving process enters the wait state. The semaphore then serves as a pointer to the head of a wait queue. The process remains in the wait state queued at the semaphore until another process sends a signal to that particular semaphore. Thus a semaphore can hold a signal until a process picks it up, or a semaphore can hold a process until a signal is sent to it.

It has been previously explained that a process may be in any of four states, i.e., the running, ready, waiting or suspended (not currently active) state. Since only one process may be in the running state, no queue organization for the process link is needed. However, a plurality of processes may be in either the wait or ready states. Moreover, there may be a plurality of different waiting states since a process may enter since a process is capable of waiting for many different events. As a result, there is one ready queue for those processes ready to have the resouce of the virtual machine; i.e., a queue of processes ready, and a plurality of waiting queues with processes waiting for an event or resource to occur in order to continue operation. As has been previously explained, a suspended process is not a currently active process, and hence no queue for those suspended processes is provided.

It has been previously shown how processes are represented in hardware, the states they may be in, and the dispatcher unit which is used to control the status and movement of the processes. (See prior art referenced herein.) Integral with semaphores for controlling process synchronization are operations on the semaphore. Two basic operations on the semaphore are required if processes are to use the semaphore as a signalling mechanism. One operation, V-Op or the V instruction, sends a signal to the semaphore. The other operation, P-Op or the P instruction, picks up a signal from the semaphore. The V instruction may be viewed as a sending operation used by the executing process that has some data and wants to send it to another process, or to any of a group of processes. The V instruction allows the process to send the data; i.e., a signal to an inbetween point, the semaphore. The semaphore stores the data until another process is ready to pick it up. In the meantime the process executing the V instruction is free to proceed since the data has been delivered.

The P instruction may be viewed as a receiving operation that is used by the process that needs data either from a particular process or from one of many processes. The P instruction allows the process to receive the data; i.e., a signal, from the semaphore. If the data is present, the process executing the P instruction continues. However if the data is not stored by the semaphore, the process executing the P instruction goes into the wait state. The semaphore holds the process in this case instead of the data. The process is held in the wait state by the semaphore until another process removes the reason for the process entering the wait state; i.e., the sending of data for the process via the same semaphore. This action is accomplished by a V instruction.

Thus a process that requires data; i.e., a signal, from another process before it can proceed, attempts to obtain the signal by executing a P instruction on a previous agreed upon semaphore. Conversely, a process that delivers data; i.e., a signal, to another process before it can proceed, attempts to transmit the data by executing a V instruction on the semaphore. Moreover, if the process receiving the data is in the wait state, its reason for being in the wait state is obviated. As a result, the V instruction also allows the process which requested the message to be transferred to the ready state. Thus the data delivered by the V instruction is stored in the process control block of the process requesting the data and is subsequently examined when the process is transferred to the running state by the dispatcher mechanism.

DETAILED DISCUSSION OF A PREFERRED EMBODIMENT

Figure 1:
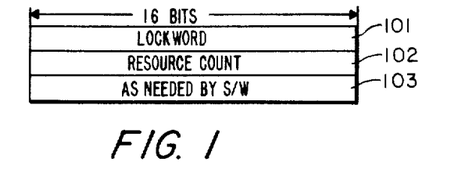
FIG. 1 is a diagrammatic representation of a semaphore having a Lock Word and Resource Count format utilized by firmware, as well as an additional format which may be utilized by software.

Referring now to FIG. 1 there is shown the format of a typical semaphore. The first word of the semaphore is a Lock Word and is 16 bits long. If no firmware in any processor is currently manipulating the semaphore, then all of the bits of the Lock Word are turned off; i.e., are all 0s. The second word of the semaphore is the Resource Count. If the Resource Count is positive, it indicates that resources are available for a requesting process; whereas if the Resource Count is 0 or negative, it indicates that no resources are available. Accordingly the first two words of the semaphore are utilized by firmware. The last word(s) of the semaphore are utilized, as needed, by the software (S/W).

Figure 2:
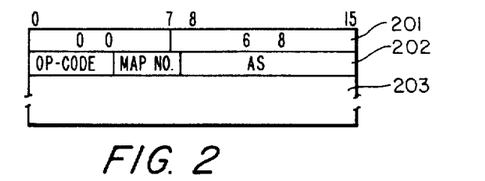
FIG. 2 is a block diagram of the format of a P-Op instruction as it resides in memory in the instruction stream.

Referring now to FIG. 2 there is shown the format of a P-Op instruction. As indicated previously the P-Op instruction may be viewed as a receiving operation; that is, used by a process that needs data either from a particular process or from one of many processes. There are three 16-bit words to the P-Op instruction 201, 202, 203. The first word 201 stores a hexadecimal constant. If the constant is 0068 it indicates that a semaphore instruction is being used. The second word stores the Op code of a P-Op instruction in the first 6 bits, followed by a 2 bit field to indicate the address-syllable map number. The P operation Op code is hexadecimal 0001011 for this embodiment. The last 8 bits of word 202 has an address-syllable AS which is chosen from the address-syllable map indicated in bits 6 and 7 of word 202. Word 203 is an additional word, which may or may not be used by the P-Op instruction as required by the address-syllable AS.

Figure 3:
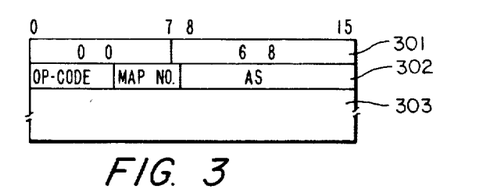
FIG. 3 is a block diagram of the format of a V-Op instruction as it resides in memory in the instruction stream.

Referring to FIG. 3 there is shown the format of a V-Op instruction. As with the P-Op instruction, it has three words 301, 302, 303, and is similar to the format of the P-Op instruction. The determination of whether a P-Op operation or a V-Op operation will be performed by the instruction is dependent on the Op code. In this particular embodiment if the Op code is 0010011, a V-Op operation is indicated.

Figure 4:
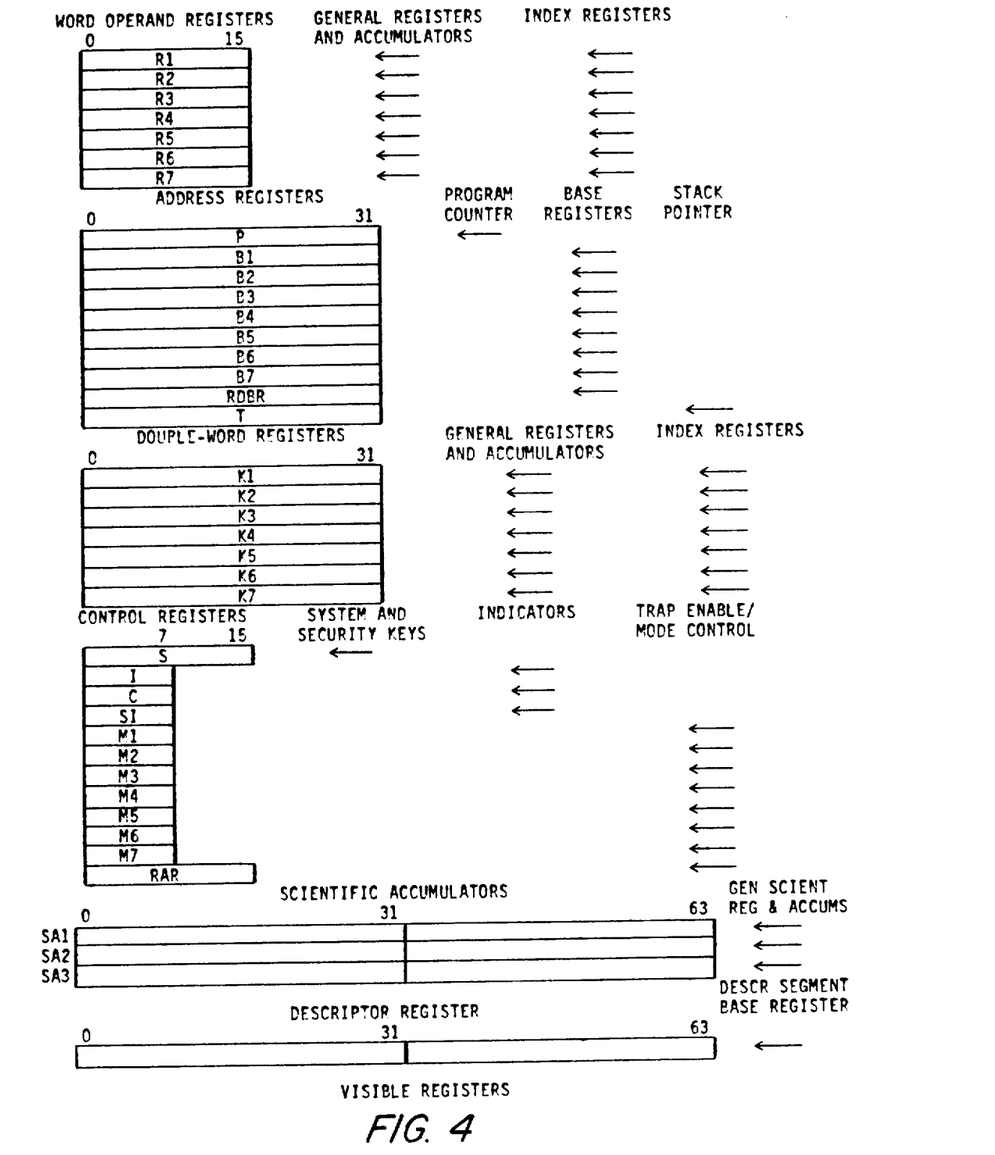
FIG. 4 is a diagrammatic representation of the visible registers of a typical computer system, some of which utilize the invention.
Figure 5:
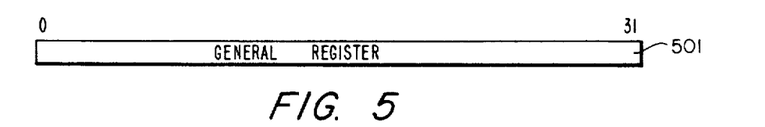
FIG. 5 is a typical schematic representation of 32-bit general registers utilized by the invention. (Shown on FIG. 4 as double-word registers K1-K7.)
Figure 6:
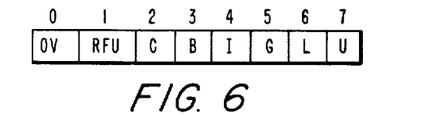
FIG. 6 is a schematic representation of the indicator register utilized by the invention. (Shown as register I of control registers on FIG. 4.)
Figure 7:
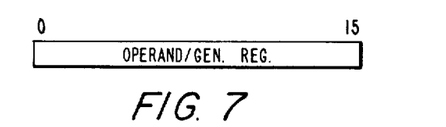
FIG. 7 is a typical schematic representation of a 16-bit word operand register, also utilized as a general register. (Shown as registers R1-R7 on FIG. 4.)

Referring now to FIG. 4 there is shown a diagramatic representation of the visible registers in the environment of the invention. It will be noted, however, that only those registers essential to the invention have been described in detail on FIGS. 5, 6 and 7. FIG. 5 is the format of Double Word Registers K1-K7 shown on FIG. 4. FIG. 6 corresponds to the Indicator Register I shown under Control Registers of FIG. 4. FIG. 7 shows the format of Word Operand/General Registers shown as R1-R7 in FIG. 4.

Referring now to FIG. 5 there is shown the format of the 32 bit Double Word General Registers shown as K1-K7 on FIG. 4. These registers are generally used as general registers and accumulators, and also for post indexing of addresses.

Referring now to FIG. 6 there is shown the Indicator Register I. The I register contains the program status indicators for general and extended integer instructions. The 0 bit stores the Overflow Indicator (OV); whereas the number 1 bit is reserved for future use (RFU). The number 2 bit (C) is the Carry bit of the latest operation designated to affect this bit. The number 3 bit is the Bit Test Indicator (B) representing the state of the last bit tested. The number 4 bit (I) is the Input/Output (I/O) Indicator representing the status of the last peripheral interrogated. The meaning of the bit is peripheral dependent, but generally I is set to 1 if the device accepted the I/O command sent to it. Bits 5, 6 and 7 (G, L, U) respectively, represent Greater than, Less than, and signs Unlike bits representing the results of the latest compare.

Referring now to FIG. 7, there is shown the format of a 16 bit Word Operand/General Registers shown as R1-R7 in FIG. 4. These registers are also used as general registers and accumulators, and also can be used for post-indexing of addresses.

Figure 8:
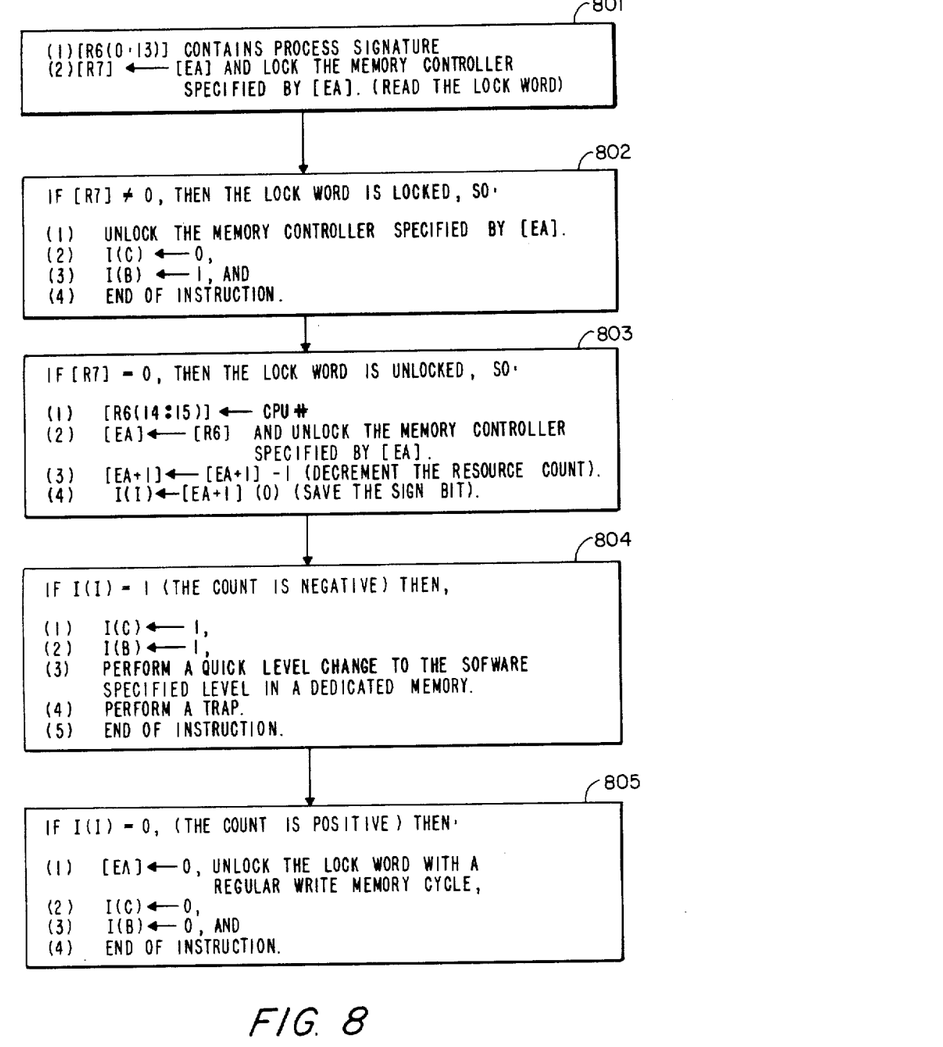
FIG. 8 is a flow diagram of the P-OP instruction of the invention.

Referring now to FIG. 8 there is shown a flowchart for the P-Op instruction. The P-Op instruction is used to request access to a resource. If a resource is available, the semaphore Resource Count is updated and the semaphore is left unlocked. The Operating System (OS) may now take the resource. If the resource is not available, then the semaphore Resource Count is updated, the semaphore is left in the locked condition and the Central Subsystem CSS is left in the appropriate state to allow the Operation System OS to queue this process on the semaphore.

Referring now to Block 801 of FIG. 8, there is shown some preconditions regarding the contents of predetermined registers in order to execute the P-Op instruction. In Step 1 of Block 801 there is shown the requirement that bits 0-13 of Operand/General Register R6 contains the process signature. (The process signature is merely a small integer that identifies the process requesting information from the semaphore.) In Step 2 the semaphore is located, utilizing its Effective Address EA (details of formulating EA is known in the prior art) and the contents of the first word, which is the Lock Word of the semaphore is placed into Operand/General Register R7. As noted previously, if all of the bits of the Lock Word are turned off; i.e., are all 0s, no processor or process is currently manipulating the semaphore. In Block 802 there is shown the case where the semaphore was locked because the contents of the Lock Word are not equal to 0. This indicates that the semaphore is currently being operated on by some processor. Accordingly in Step 1 the firmware for the process requesting the semaphore will unlock the Memory Controller that has the memory that contains the semaphore so that the process may try again to use it at a later time. (The Memory Controller had become locked as a side effect of reading the contents of the Lock Word into Operand/General Register R7.) Additionally in Steps 2 and 3, the firmware sets the Carry bit (C) of Indicator Register I to 0, and the Bit Indicator (B) of Indicator Register I to a 1. This indicates to the software that the P operation was not completed because some other process or processor was manipulating the semaphore and accordingly was locked, and that the software should retry to access the semaphore later. Finally in Step 4 the instruction ends.

Block 803 shows the condition where the semaphore is currently unlocked, this is indicated by the fact that Operand/General Register R7 contains 0s. Accordingly the processor will then proceed to perform the P operation. It does this by first placing its own processor number in bits 14 and 15 of Operand/General Register R6. It should be noted that as previously described, bits 0-13 of General Register R6 were loaded with the process signature before the instruction was executed. Accordingly the process signature of the process performing the P operation is stored in bits 0-13 and the processor number of the processor it is executing on is stored in bits 14 and 15 of Operand/General Register R6; this identifies the process and processor. They are utilized to unlock the Memory Controller specified by the Effective Address EA. In Step 2 the content of R6 is stored in the Lock Word (to lock the semaphore) and the memory controller lock is reset. In Step 3 of Block 803 the resource counts stored in the second word 102 of the semaphore of FIG. 1 is decremented by 1. (The Resource Count word 102 of the semaphore of FIG. 1 is located by incrementing the Effective Address of the Lock Word by one unit.) In Step 4 of Block 803 the Sign bit of the decremented resource count is copied in the I bit of the Indicator Register. This will inform both the software and the firmware whether or not there was, in fact, a resource available. By inspecting the value of the Sign bit that was copied into Indicator Register I, the firmware determines which of two situations exist. The first situation is where a resource is available and the second situation is where a resource is not available. If a resource is not available, a quick level change is made to lock out any interrupts, and a trap is taken to pass control to the Operating System OS and this ends the semaphore instruction. The OS then queues the requesting process on the semaphore. The locked semaphore keeps other processors, which may be running on other processors of the CSS, or at a higher priority away from the semaphore until the OS performs the queueing operation. Once the OS has queued the process on the semaphore, it clears the semaphore's locks. Referring to Block 804 it is shown the count in the Indicator Register I is negative, indicating that a resource is not available. Accordingly in Steps 1 and 2 the firmware places 1s in both the Carry Indicator bit and the Bit Test Indicator bit of the Indicator Register as shown in Steps 1 and 2 of Block 804. In Step 3 a quick level change is made to a software specified level of privilege that, in effect, inhibits the handling of any interrupts that might have any possible effect on semaphores. (However certain critical interrupts, such as clock handling interrupts, may still be allowed with this level of interrupt inhibiting.) In Step 4 the firmware then causes a trap to occur to dispatch the Operating System subroutine that will requeue the process from the Ready queue to the Wait queue. Finally in Step 5 of Block 804, the instruction ends and the Operating System's trap handler for this trap will then pick up control. Sooner or later the resource is made available by the execution of a V-Op instruction (to be later described), the queueing process will be reversed to take it back into a Ready queue at which time the control will return back to the processor as if there had been no software involved whatsoever.

The second condition to be considered when the semaphore is found unlocked is where the resource count is not negative, but positive, and indicates that the resource is available to the software and the software has laid claim to the resource. This situation is shown in Block 805. In Step 1 the firmware unlocks the Lock Word by writing all 0s into the Lock Word located at Effective Address EA. In order to indicate that the resource was available, and claim was made to it, 0s are placed in the processor's Carry bit and Bit Test Indicator (B) respectively of the Indicator Register. In Step 4 the instruction then terminates.

Figure 9:
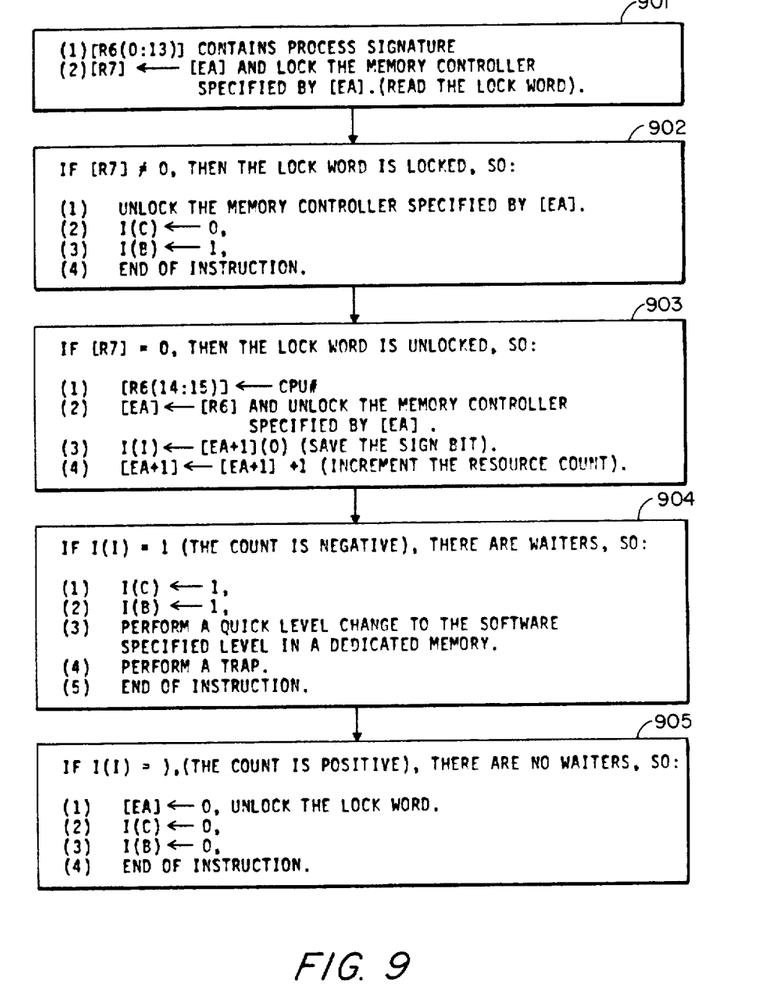
FIG. 9 is a flow diagram of the V-Op instruction of the invention.

FIG. 9 shows the flow chart of the V operation instruction. The V operation instruction is used to return a resource. If no process is waiting for the resource, then the semaphore resource count is updated and the semaphore is left unlocked. If there is at least one process waiting for the resource, then the semaphore resource count is updated, the semaphore is left locked and the central subsystem is placed in the appropriate state in order to allow the Operating System to cause the waiting process to be activated.

Referring to Block 901, the conditions necessary for execution of the V-Op instruction are shown. As with the P-Op instruction, bits 0-13 of Register R6 contains the process signature of the process executing the V-Op instruction, and Register R7 contains the contents of the Lock Word specified by the Effective Address EA of the semaphore. (In other words, the firmware has read the Lock Word of the semaphore addressed by EA into Register R7.) Then as shown in Block 902 the firmware inspects the value of the Lock Word in Register R7 and if it is found to be not 0, it indicates that the semaphore is currently in use by some other process. Accordingly in Step 1 of Block 902 the firmware will then unlock the Memory Controller specified by the Effective Address EA; indicate in Step 2 that the semaphore was found locked by putting a 0 in the Carry bit (C) of Indicator Register I; place, in Step 3, a 1 in the Bit Test Indicator (B) of the Indicator Register; and terminate the instruction in Step 4. It should be noted that this is a similar procedure as the P operation for the situation where the semaphore has been found locked; i.e., in use by another process.

In Block 903 there is shown the steps taken when the semaphore is not in use by another process; i.e., the contents of Register R7 are equal to 0, and hence the Lock Word is unlocked. First the processor's process or CPU number is placed in bits 14 and 15 of the R6 register. As previously noted, this register already contains the process signature of the process executing this instruction in bits 0-13. The value of the R6 register is then written into the first word, the Lock Word, of the semaphore in order to place it in a locked state and the Memory Controller specified by the Effective Address EA is unlocked. In Step 3 of Block 903 the firmware reads the resource count from the second word of the semaphore (located at EA+1) and saves the Sign bit from that count in the I bit of the Indicator Register. Then in Step 4 the resource count is incremented to indicate the relinquishment of a resource by the process. Then the firmware must determine and handle one of two conditions as follows: (a) some process is waiting for the freed resource; (b) no process is waiting for the freed resource. In Block 904 the firmware first inspects the value of the I bit in the Indicator Register to determine whether the resource count was negative before incrementing it. If the resource count was negative, then it indicates that there is some process or processes waiting for the resource that has just been freed. Then the software is invoked to take one process that is in a Wait queue and place it in a Ready queue so that the process may claim the resource that has just been freed. However, prior to the invocation of the software, the firmware places 1s in the processor's Carry bit (C) and the Bit Test Indicator (B) respectively of the Indicator Register I in order to inform the software of the state of that particular semaphore. Once again, as with the case of the P operation, the firmware in Step 3 of Block 904 performs a quick level change to a software specified level to lock out any interrupts that could affect the semaphore operation. Then in Step 4 it transfers control to a software routine via a trap mechanism. Finally in Step 5 the instruction is terminated. The software routine will then requeue one of the processes waiting on the Wait queue back into the Ready queue.

In Block 905 there is shown the steps to be taken when there are no waiting processes as indicated by the fact that the I bit in the Indicator Register was non-negative before being incremented. Accordingly no software routine need be dispatched. The firmware merely unlocks the semaphore in the first Step by writing all 0s into the first word of the semaphore specified by the EA and writing 0s in the Carry bit (C) and Bit Test Indicator bit (B) respectively, and finally in Step 4 ends the instruction. This informs the software that the instruction has been completed and the resource has been relinquished.

Having shown and described one embodiment of the invention, those skilled in the art will realize that many variations and modifications can be made to produce the described invention and still be within the scope of the claimed invention. Thus, many of the steps may be altered or replaced by different steps which will provide the same result and fall within the spirit of the claimed invention. It is the purpose of the invention, therefore, to be limited only as indicated by the scope of all the claims.

We claim:

1. In a multiprocessing/multiprogramming computer system functioning under control of an operating system and having a plurality of system resources that are shared by circuits in said computer system, a method implemented using a semaphore for each system resource used to indicate the availability of each resource, and each semaphore is in a memory and is addressed using an effective address, said method comprising the steps of:

checking the contents of a first word of a first semaphore to determine if the semaphore has been seized to either check the status of a first resource or to change the first semaphore to reflect a change in the availability of said first resource;

checking the contents of a second word of said first semaphore when the check of said first word indicates that said first semaphore has not been seized to determine if said first resource is available to be used by a first circuit in said computer system that is requesting access to said first resource;

storing data in said first word indicating said semaphore has been seized;

addressing a location in said memory where said first word of said first semaphore is stored using the identity of said first resource, said first word having specific data written therein when said first semaphore has not been seized to determine the availability status of said first resource and when said first resource is available for use by any of said circuits, and the presence of said first circuit identity in said first word prevents others of said circuits from checking said semaphore; and granting access to said first resource by said first circuit when said check of said second word indicates that said first resource is available for use.

2. The method in accordance with claim 1 further comprising the steps of:

storing the identity of said first circuit along with said first resource identity when it is determined that said first resource is available; and writing said first resource identity and said first circuit identity into said first word when said first circuit is granted access to said first resource, the presence of said first resource identity and said first circuit identity in said first word preventing others of said circuits from checking said semaphore.

* * * * *